United States Patent [19]

Rettew

[11] Patent Number: 4,591,477
[45] Date of Patent: May 27, 1986

[54] APPARATUS AND METHOD FOR SERVICING A NUCLEAR REACTOR SYSTEM

[76] Inventor: Robert A. Rettew, 217 Kingsway Camelot, Clemson, S.C. 29631

[21] Appl. No.: 432,002

[22] Filed: Sep. 30, 1982

[51] Int. Cl.$^4$ .................. G21C 19/04; F16L 55/12
[52] U.S. Cl. .................. 376/204; 376/249; 376/260
[58] Field of Search .................. 376/204, 249, 260; 138/89, 90, 93; 220/217

[56] References Cited

U.S. PATENT DOCUMENTS

| | | | |
|---|---|---|---|
| 3,593,749 | 1/1971 | Reardon | 138/93 |
| 3,946,761 | 3/1976 | Thompson et al. | 138/93 |
| 3,978,892 | 9/1976 | Scodino | 138/89 |
| 4,131,018 | 12/1978 | Muller et al. | 376/249 |
| 4,393,899 | 7/1983 | Tsuji et al. | 376/260 |
| 4,436,692 | 3/1984 | Stenabaugh | 376/204 |
| 4,470,946 | 9/1984 | Vassalotti et al. | 376/204 |

*Primary Examiner*—Salvatore Cangialosi
*Attorney, Agent, or Firm*—Cort Flint

[57] ABSTRACT

A method and apparatus for servicing a nuclear reactor system is disclosed whereby a reactor vessel (10) filled with radioactive water from a refueling canal (16) and associated steam generator (30) and pump units (38) may be serviced simultaneously while the reactor is out for refueling. The apparatus includes a plug unit (A) and an installation assembly (B) for inserting a plurality of plug units into reactor vessel nozzles (40). Each plug unit (A) includes a radially expandable seal rings (50, 52) and secondary seal (58) carried by a tapered portion (56) which wedges the plug unit (A) into the nozzle (40) under hydrostatic pressure. Installation assembly (B) includes a pair of telescoping units (70) having a pair of telescoping arms (72) and (74) which moves axially in opposite directions to insert plug units (A) carried at the ends thereof into diametrically opposed nozzles. A brace (120) provides a reactionary force against which the nozzles may be pulled out in the case of difficulty. The method includes plugging the nozzles, draining the radioactive water from the piping system, and servicing the pump units (38) and steam generator (30) while the reactor vessel (10) is filled with water and being inspected and serviced. After all servicing is complete, the installation assembly is lowered into the water and utilized to remove the plugs. The reactor system may then be returned to operation without further delay in servicing the associated components of the reactor.

17 Claims, 7 Drawing Figures

APPARATUS AND METHOD FOR SERVICING A NUCLEAR REACTOR SYSTEM

BACKGROUND OF THE INVENTION

The invention relates to apparatus and a method for servicing a nuclear reactor system wherein the cold leg entrance nozzles of a nuclear reactor vessel are plugged so that servicing and inspection of the reactor and its associated components may be carried out simultaneously.

In the conventional pressurized water nuclear reactor system the nuclear reactor is disposed within an annulus of a containment structure located in the reactor building. The containment annulus and reactor vessel are disposed below a refueling canal which is filled with water during refueling. A refueling bridge is disposed above the canal which assists in the refueling and inspection operations.

In a typical nuclear reactor installation, the nuclear reactor vessel must be routinely inspected. This means the reactor must be shut down and the fuel and core support assemblies removed. During this inspection, the fuel and core support assemblies must be removed from the nuclear reactor vessel and the interior of the vessel inspected for cracks in weld joints, and other possible sources of leakage. In order to remove the fuel and core support assemblies, the water canal above the reactor must be filled with water in order to provide shielding for the fuel assemblies and the core support assemblies since they are radiologically very hot. The core support assembly is placed in a deep end of the canal and the fuel assemblies are maintained in the spent fuel pool, both of which must be maintained under water at all times for shielding. Since the top closure is off of the reactor vessel, the vessel is filled with water. The interior of the nuclear reactor vessel is inspected by means of remote control and automatic inspection equipment that is lowered into the interior of the vessel.

Generally, there are two types of steam generators used in pressurized water reactors. The U-tube steam generator is typically utilized in systems such as that manufactured by The Westinghouse Company and Combustion Engineering, Inc. These steam generators have an entrance port in the lower portion of the steam generator unit through which water heated by the nuclear reactor passes and travels upwardly through the steam generator and back down through a U-tube. The water then exits the steam generator at about the same level at which it enters. The other type of steam generator unit such as that manufactured by the Babcock & Wilcox Co. is commonly referred to as the once-through type steam generator unit. In this type of steam generator unit the water heated by the nuclear reactor travels upwardly and enters the top of the steam generator unit whereupon it travels down through the unit and leaves the unit at the lower portion of the unit. A pump unit pumps the water back into the nuclear reactor through an entrance nozzle at an elevated position which corresponds with the level of the outlet nozzle for heated water.

It would be desirable to be able to inspect the associated steam generator and pump units at the same time that the interior of the reactor vessel is being inspected. However, water is present in the canal and in the interior of the reactor vessel, and because of the elevated position of the canal water level relative to the pump unit and steam generator, water flows through the cold leg piping system connecting the reactor vessel to the steam generator and pump units. The pump unit and steam generator units are flooded. Servicing of the steam generator and pump units is not possible until after the reactor vessel is refueled and re-assembled and the water drained therefrom and from the canal.

Typically, it takes approximately three weeks to inspect the vessel and refurbish the vessel and drain the water fom the canal before the pumps and steam generator units may be inspected prior to the reactor being reactivated. If the steam generator units and pumps could be serviced simultaneously with the nuclear vessel, a considerable amount of savings in time and money could be had along with a quicker return of the unit to service all of which would result in quicker resumption of the generation of electrical and power and income therefrom.

Heretofore, it has been attempted to place expandable bladders into the entrance nozzles of the cold leg piping leading from the reactor vessel to the steam generator. However, these bladders have presented considerable difficulty in staying in place and have become dislodged resulting in water flowing into the pumps and steam generator units during servicing. Since the water is radioactive, this would present a harzardous condition to the servicemen.

It has been proposed in a paper published by The American Society of Mechanical Engineers entitled "Steam Generator Nozzle Dams for Primary Head Activities", publication no. 80-C2/NE-11 by Lewis and Woods to plug the nozzles leading from A U-type steam generator unit to the reactor for the purpose of inspecting the steam generator tubing. This is done by plugging the nozzles in the steam generator unit. However, this does not provide access for servicing the pump units which would remain flooded even if the steam generator nozzles were plugged, which would be particularly problematic in once-through type steam generators. The sealing plugs proposed in this paper are manually inserted by hand.

It has also been proposed in boiling water reactors such as those manufactured by The General Electric Company, that the steam line leading from the reactor vessel to the turbines be plugged from the interior of the reactor vessel. However, this type plug requires that there be no water present in the water canal in order for it to be utilized. Moreover, this plug and the associated apparatus for inserting the plug into the nozzle must remain in place during use. This would render such apparatus unusable for servicing a pressurized water nuclear reactor vessel which must be filled with water and completely open from the top for entry of automatic inspection equipment.

Numerous methods and devices for plugging pipelines have been proposed, for example, in U.S. Pat. Nos. 3,381,714; 3,483,895; and 3,495,626, however, none of the above presents a suitable device or method for servicing a nuclear reactor system which requires a high degree of reliability in sealing off the system and presents different problems due to the radioactive environment and other associated problems such as submergence of the reactor vessel.

Accordingly, an important object of the present invention is to provide a method and apparatus which will permit servicing of a pressurized nuclear reactor vessel and its associated steam generator and pump units during the time that the refueling canal is filled with water.

Still another important object of the present invention is to provide a method and apparatus for plugging the entrance nozzles of a cold leg piping system of a pressurized water nuclear reactor vessel to permit servicing and inspection of the vessel and associated steam generator and pump units at the same time during refueling of the reactor.

Still another important object of the present invention is to provide a method and apparatus for plugging the nozzles of a nuclear reactor system during refueling so that the steam generator and pump units may be serviced simultaneously with the reactor vessel.

Still another important object of the present invention is to provide a method and apparatus for installing sealing plugs in the nozzles of a pressurized water nuclear reactor vessel which is submerged in water from a remote location.

Still another important object of the present invention is to provide a method and apparatus for installing sealing plugs in the entrance nozzles of a pressurized water reactor vessel wherein the sealing plugs of opposed nozzles are inserted simultaneously from opposite directions whereafter the installation mechanism may be removed to accommodate the utilization of automatic inspection equipment within the vessel.

Still another important object of the present invention is to provide a method and apparatus for installing sealing plugs in the entrance nozzles of a pressurized water reactor vessel which automatically aligns the sealing plugs for installation and provides a reactionary force against which the plug may be removed in the case of difficulty.

Yet another important object of the present invention is to provide a sealing plug for an entrance nozzle of a pressurized water reactor vessel which has a primary sealing means for sealing against a wall of an entrance nozzle and a secondary sealing means which provides a backup seal and prevents the seal from being dislodged.

Still another important object of the present invention is to provide a sealing plug for an entrance nozzle of a pressurized water reactor vessel having a contoured portion by which the plug is retained in the nozzle under hydrostatic pressure.

SUMMARY OF THE INVENTION

The above objectives are accomplished according to the present invention by providing an installation assembly which may be supported by a polar crane of the nuclear reactor containment building may be lowered into the interior of an empty nuclear reactor vessel when the canal is filled with water. The assembly includes at least one installation arm unit which has a pair of diametrically opposed telescoping arms for inserting a sealing plug into the entrance nozzles of the reactor. A connector mechanism is carried by the ends of the arms by which the sealing plug may be attached to an end of each arm. The connector mechanism includes a latch which will release the sealing plugs after installation so that the assembly may be raised by the polar crane and removed from the reactor vessel. This leaves the reactor vessel completely open for inspection. The installation assembly includes a reactor beam which provides a reaction force against the reactor vessel wall if a plug becomes difficult to remove. The telescoping arms of the installation device may be mechanically or pneumatically operated. The sealing plug includes a radially expanding sealing member which expands to engage a wall of the cold leg entrance nozzle. An automatic system for maintaining the radial sealing member in an expandable condition may be provided. In addition, a secondary seal is carried by a conically shaped portion of the plug. The conical portion of the sealing plug forces the plug into the nozzle under hydrostatic pressure. An O-ring may be provided about the outer edge of the conical shaped member to provide the secondary seal.

The method contemplates lowering the installation assembly and sealing plug into an open reactor vessel with the closure head removed and the refueling canal filled with water. The polar crane of the containment building may be utilized to lower the plug and assembly into the vessel. The installation assembly is aligned such that the sealing plug center line is concentric with the nozzle center line, then the installation assembly inserts the opposing sealing plugs simultaneously into the opposing nozzles. The sealing plugs are then released from the installation assembly after the sealing rings of the plugs have been activated and forced against the nozzle walls. With the installation device retracted and removed from the vessel, the interior of the vessel may be inspected. The reactor coolant can be drained from the piping system and the steam generator and pump units facilitating access to the reactor coolant pumps and steam generator units. After the interior of the vessel and the other components of the system have been serviced, the installation assembly is again lowered into the interior of the vessel and inserted into the plugs simultaneously by means of the telescoping arms. An opposite force is then placed on the sealing plugs which withdraws them from the nozzle. The reactor may then be readied for operation.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 7 is a schematic diagram of a pneumatic circuit for inflating and deflating seals in a plug unit according to the invention.

DESCRIPTION OF A PREFERRED EMBODIMENT

Figure 1:
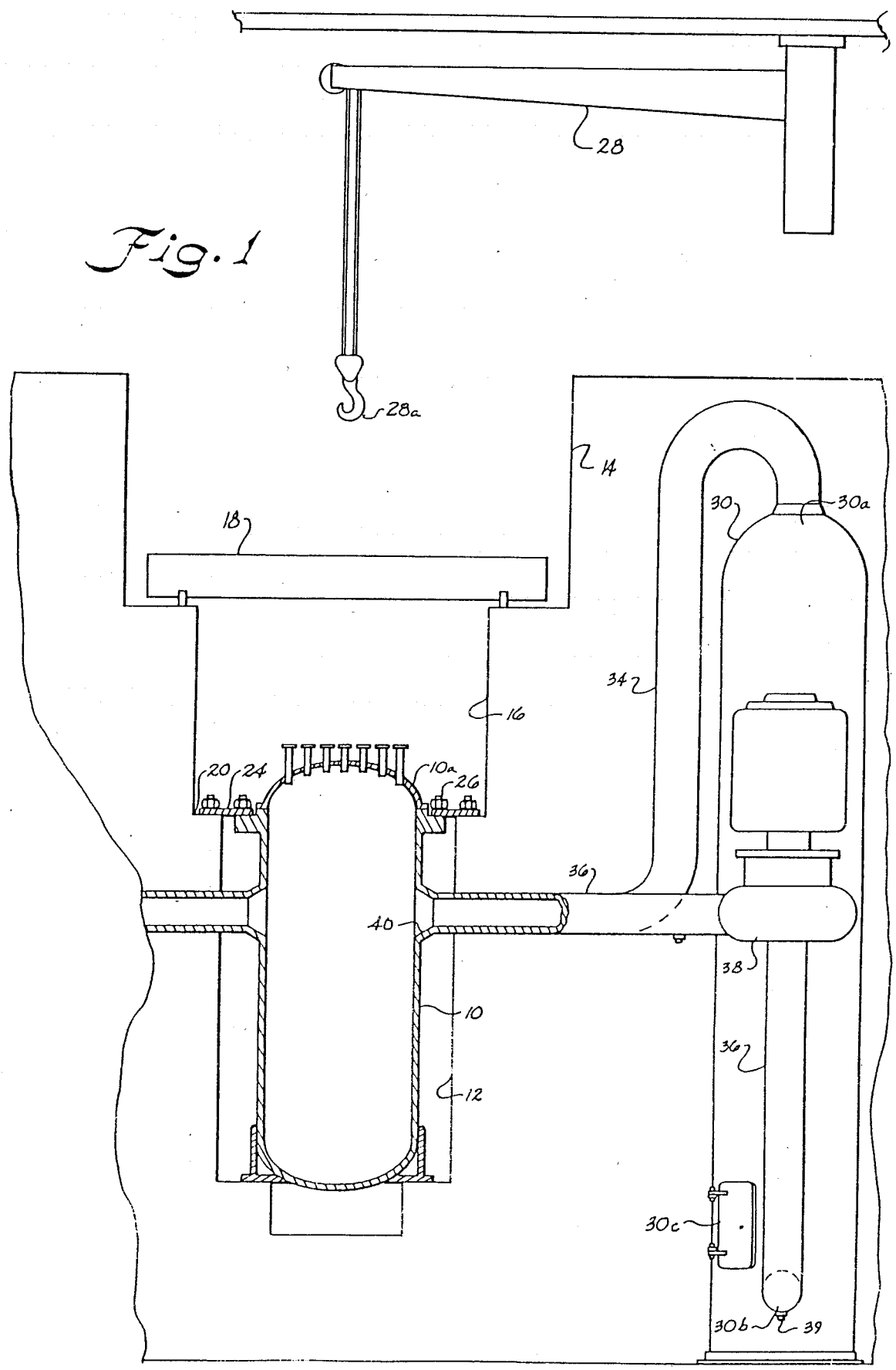
FIG. 1 is partial cut-away view of an elevation illustrating a nuclear reactor system and containment structure to which the present invention is applicable.

The invention relates to a method and apparatus for servicing a nuclear reactor system of the type which includes a reactor vessel, and aassociated steam generator recirculation pump units. In particular, the invention relates to that type of nuclear reactor system referred to as a pressurized water nuclear reactor and a steam generator unit commonly referred to as a once through steam generator unit. Since the details of such a system are well known to those skilled in the art, only that portion of the system and its containment structure as are necessary to an understanding of the invention are illustrated herein.

Referring now to the drawings, a nuclear reactor vessel 10 is illustrated as being disposed in an annulus 12 of the containment structure for the nuclear reactor system which is housed in the containment building. The containment structure is provided by a concrete substructure 14 in the containment building which includes the annulus 12, and a refueling canal 16 which is filled with water during refueling of the reactor. A refueling bridge 18 is carried above the canal 16 and may be made movable over the canal by supporting the bridge on wheels. The bottom of the canal 16 includes an annular ledge 20. An annular flange plate 24 is bolted between the ledge 20 and a recessed flange 26 which is part of the reactor vessel to seal the bottom of the canal and isolate the annulus 12.

A polar crane 28 typically is carried in the containment building and supported above the refueling canal 16 for moving the various assemblies during refueling and other operations in the containment building. The refueling canal 16 includes a deep pool (not shown) in which the core support and fuel assemblies are placed during refueling so that they are shielded.

A top closure 10a is provided for the reactor vessel which is removed during refueling of the reactor vessel such that the top of the vessel is open for removal of the fuel and core support assemblies (not shown).

Associated with the nuclear reactor vessel is a steam generator unit 30 which is of the once through type. In this type of steam generator, heated water leaves the interior of the nuclear reactor vessel 10 through an outlet nozzle 32 and goes through a hot leg piping system 34 to an upper portion 30a of the steam generator unit 30. The heated water then passes through the steam generator unit and exits through a lowermost portion at an outlet 30b. The outlet at the lowermost portion of the steam generator is connected by means of a cold leg piping system 36 to an recirculation pump unit 38 which delivers the cooled water to a cold leg entrance nozzle 40 of the reactor vessel. A drain 39 is provided for draining the piping system 36, pump 38, and steam generator 30. A lower manway 30c provides access to the lower portion of the steam generator for servicing of the internal tubing and components thereof.

Figure 2:
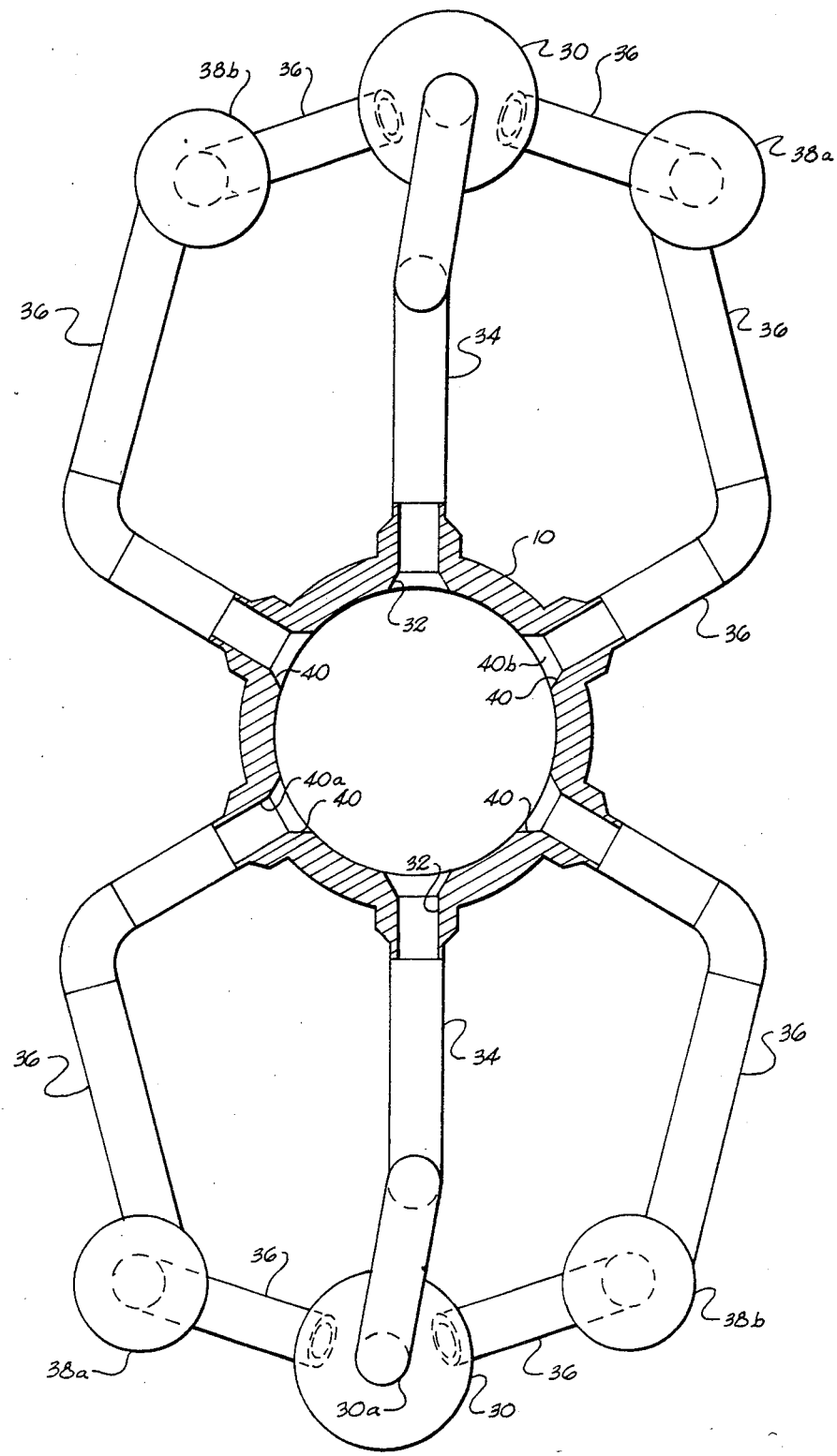
FIG. 2 is a schematic view illustrating a nuclear reactor vessel and associated steam generator and pump components and a piping system for interconnecting the same.
Figure 3:
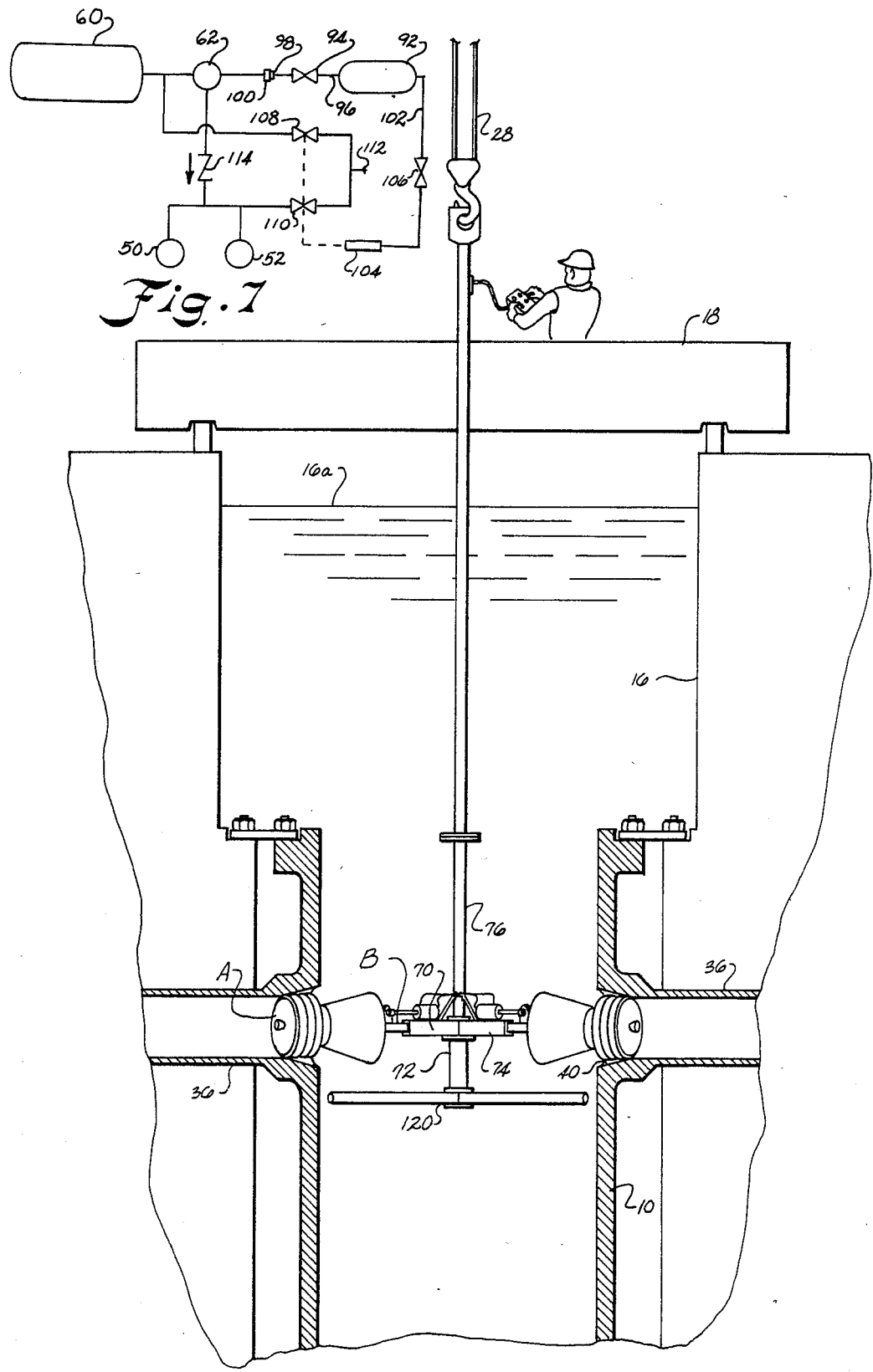
FIG. 3 is a partial cut-away view illustrating a method and apparatus for servicing a pressurized water nuclear reactor system according to the present invention.

As illustrated in FIG. 2, there are normally utilized two steam generator units each having two pump units 38. There are two outlet nozzles 32 in the nuclear reactor vessel diametrically opposite one another. Each steam generator unit 30 includes a pair of outlets 30b at the lowermost portion each of which is connected to recirculation pump 38. There is a cold leg piping system going from the steam generator unit 30 to each associated recirculation pump 38 and to the nuclear reactor vessel 10. There is an entrance nozzle 40 for each leg of the cold piping system.

As can best be seen in FIG. 2, there are four cold leg entrance nozzles 40 in the reactor vessel. They are arranged in diametrically opposite pairs such as 40a and 40b. There are two pairs which are 60° apart from each other around the circumference of the vessel. When filled, the water level 16a of the refueling canal 16 is substantially above that of the reactor vessel nozzles 32 and 40 and above the level of the steam generator outlets 30b and recirculation pumps 38. When the top closure 10a is off of the reactor vessel, water fills the reactor vessel during refueling and the water floods back through the entrance nozzles 40 through the cold leg piping system 36 into the pump unit 38 and thus back into the lower portion of the steam generator unit through outlet 30b.

Figure 4:
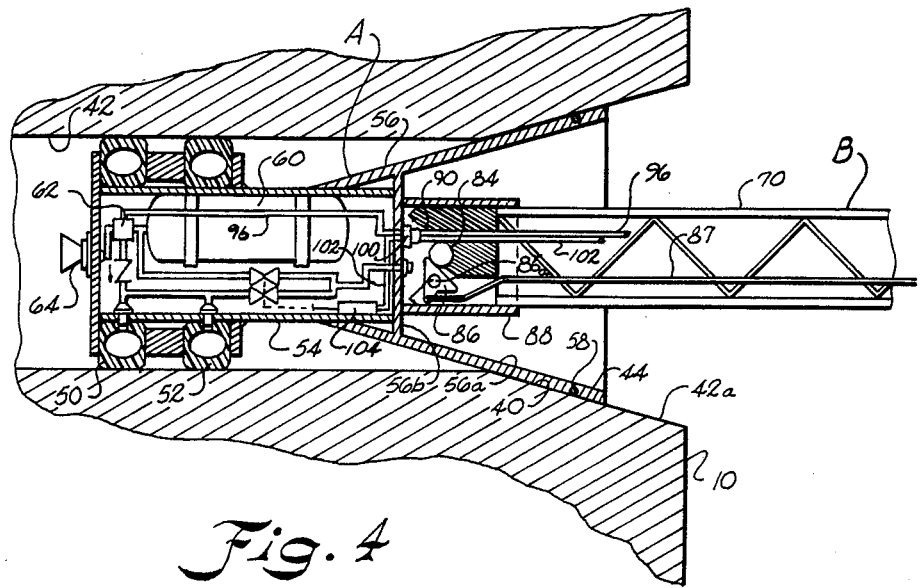
FIG. 4 is a sectional view illustrating a sealing plug unit for a cold leg entrance nozzle according to the invention.
Figure 5:
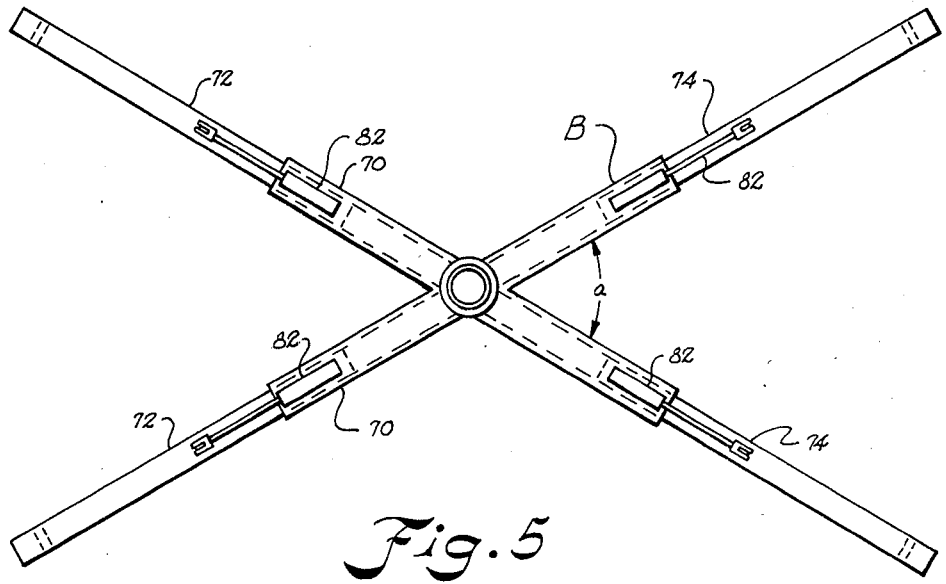
FIG. 5 is a plan view of an installation assembly for inserting a sealing plug unit according to the invention.
Figure 6:
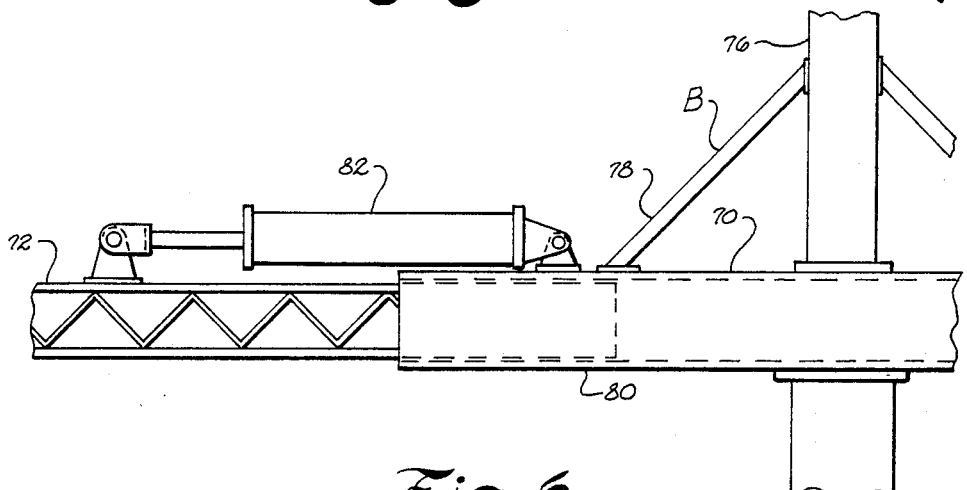
FIG. 6 is an elevation illustrating in part an installation assembly according to the invention having telescoping arms.

Referring now in more detail to the invention, FIG. 4 illustrates means for sealing the entrance nozzle of the cold leg piping system which includes a sealing plug unit A which includes a pair of radially expandable sealing rings 50 and 52 which may be urged outwardly radially against the wall 42 of the entrance nozzle by either pneumatic or mechanical means. The sealing means includes a first axial body portion 54 which carries the radial sealing rings 50 and 52 and a second contoured body portion 56 which is conically shaped and tapered to correspond to the shape of the tapered walls 42a of entrance nozzle 40.

An auxiliary sealing means for sealing the entrance nozzle is provided by an O-ring 58 carried adjacent an end of the conical portion 56 which abuts against and engages the tapered wall 44 of the entrance nozzle. The back portion of the conical portion is open. However, the peripheral interior walls 56a of the conical portion and a back wall 56b thereof are hydrostatically under load from the water pressure inside the vessel interior when the plug unit is inserted in the entrance nozzle to wedge and retain the plug unit in place.

In the embodiment shown, the radially expandable sealing rings 50 and 52 may be expanded in the radial diection against the wall 42 of the nozzle by means of compressed air. A storage tank 60 of compressed air is illustrated which is filled with compressed air from a remote location along with sealing rings 50, 52 upon plug insertion as will be more fully hereinafter explained. A conventional pressure regulator valve is provided at 62 which may be set at a suitable pressure such as 60 psi to regulate the pressure in the expandable inflatable sealing rings 50 and 52 to between 50 to 60 psi. Should the seals lose pressure, valve 62 will open and admit air to the seals maintaining them inflated during use. Automatic supply of the compressed air may thus be provided to replace air and maintain the seals inflated. An audible signal device may be provided at 64 connected to of regulator 62 which produces an audible signal upon detection of any loss of pressure in the sealing rings as cause valve 62 to open so that servicemen working on the pump unit or in the lower manway 30c may have an advance warning of the possibility of leakage. Signal device 64 may be an air horn operated by air from tank 60 upon being triggered by the opening of pressure regulator 62.

It will be noted that the conical portion 56 of the valve means terminates short of the interior wall of the vessel 10 such that the plug unit will not obstruct the automatic sensing equipment utilized to inspect the interior walls of the reactor vessel.

Means for installing the plug unit in the nozzle from a remote location or the refueling bridge 18 above the water level 16a of the refueling canal is provided by an installation assembly B. As illustrated, the installation assembly includes reciprocating means by which the plug unit A may be inserted and removed from the entrance nozzle 40. The reciprocating means is illustrated in the form of a telescoping arm unit 70 which includes a pair of telescoping arms 72 and 74 on each end which retract and extend in diametrically opposite directions. As illustrated, a pair of telescoping units 70 illustrated sixty degrees apart (angle a) which may vary depending on the reactor design. Each of the units includes a pair of oppositely extending telescoping arms 72 and 74. A lifting mast 76 is provided which may be connected to the hook 28a of the polar crane in the containment building to provide a means for raising and lowering the installation assembly from the refueling bridge. Suitable bracing such as at 78 may be provided between the telescoping units 70 and the lifting mast 76.

As illustrated, the telescoping arms 72 and 74 may be extended and retracted relative to the housing 80 of the telescoping unit by means of a pneumatic cylinder 82 connected between the housing and the respective telescoping arms which is controlled remotely from the refueling bridge. Any suitable remote controls as are well known and conventional may be utilized to control the crane 28 and air cylinder 82.

Connecting means for connecting the plug unit and the telescoping arms is provided by means of a latch pin 84 carried by the plug unit and a latching member 86 which is carried by the remote end of the telescoping arms. The latching member 86 pivots about a pivot 86a and may be controlled remotely from bridge 18 by means of mechanical linkage 87.

An alignment receptacle 88 is carried by the back side 56b of the cone shaped portion 56 of the plug unit. A self-aligning V-shaped slot 90 is provided in the connecting end of each telescoping arm such that as the telescoping arm enters the alignment receptacle the pin 84 is centered in the groove such as to positively latch with the latching member 86. The latching member 86 may be pivoted in and out of latching engagement with the pin 84 remotely by using any latch with the latching member 86. The latching member 86 may be pivoted in and out of latching engagement with the pin 84 remotely by using any conventional remote operating equipment such as linkage 87. With the latching member 86 pivoted counter-clockwise from the position shown, the telescopic arm 70 will be able to be pulled away from the latch pin 84.

Any suitable actuating means may be utilized for effecting inflation and deflation of seal rings 50 and 52 when the sealing plug is in place. A simplified schematic diagram is ilustrated in FIG. 7 for inflating and deflating the sealing rings 50 and 52. A source 92 of compressed air is carried on the bridge 18 connected to regulator valve 60 by an air line 96. A conventional two-way valve 94 is in the line. A female coupling 98 connected to an end of line 96 connects with a male coupling 100 fixed in wall 56b which then connects a section of line 96 to the regulator valve. A second air line 102 connects by a coupling 98 and 100 to an air cylinder 104 for actuating the cylinder. A conventional two-way valve 106 manually operated from bridge 18 controls the air supply thereto. Air cylinder 104 actuates a pair of bleed valves 108, 110 which vent seals 50 and 52 along with tank 60 at vent 112 during seal deflation. Seals 50, 52 inflate via valve 60 while tank 60 is being filled after plug insertion. A check valve 114 permits flow only in the direction indicated by an arrow to keep air in the seals.

Couplings 98 and 100 may be counter parts of a conventional quick-release type coupling which is closed when the male coupling is separated. Since lines 96 and 102 are separate lines, a double coupling 98, 100 having two separate passages may be utilized or two separate couplings.

In operation, coupling 98 will be inserted in coupling 100 with plug A connected to the assembly B as can best be seen in FIG. 4. Upon insertion, valve 94 will be open and air will be admitted to storage tank 60 and sealing rings via regulator 62 which will be open since the pressure is less than 60 psi on the sealing rings. Upon retraction of the arm 72, coupling 98 is closed and air in tank 60 maintains the system if needed. During plug removal, insertion of arms 72 in alignment receptacle 88 connects coupling parts 98, 100. Valve 94 is closed and valve 106 open to actuate cylinder 104 via air line 102 which opens vent valves 108, 110 to vent air from the tank and sealing rings simultaneously.

The entire plug insertion operation including the critical alignment of the nozzles and the plugs may be carried out by utilizing remote video equipment under water which may vary up to thirty feet in depth.

A means for bracing the installation assembly and producing a reactionary force against which the plugs may be removed from the nozzles is provided by a rection beam 120 which is carried integrally with the telescoping arm unit 70. The reaction beam 120 abuts against the interior of the reaction vessel below the nozzle from which the plug is being withdrawn to provide a reaction force against which the plug may be pulled. This may occur in the case of a single plug or in the case of an opposing plug where the braced plug becomes more difficult to remove than an opposing plug.

It will be noted that the telescoping arm units are arranged at a sixty degree angle between each other such that they will simultaneously insert four plugs simultaneously in the four entrance nozzles of the cold leg piping system. In this manner, the diametrically opposed plugs will be installed simultaneously to provide a balanced loading thrust for inserting the plugs in the respective entrance nozzles which provides stability and positive alignment during installation. The alignment is important such that a positive seal and retention of the plug unit will be provided in each entrance nozzle.

While the invention has been disclosed for sealing the cold leg nozzles of a pressurized water reactor vessel employing a once-through type steam generator unit, the invention may also have application to other type units such as in plugging the hot and cold water nozzles of a U-tube type unit where an inlet and outlet are both at the bottom of the unit below the canal water level.

While a preferred embodiment of the invention has been described using specific terms, such description is for illustrative purposes only, and it is to be understood that changes and variations may be made without departing from the spirit or scope of the following claims.

What is claimed is:

1. Apparatus for servicing a pressurized water nuclear power system during a fuel outage wherein the system is the type which includes a reactor vessel disposed in a containment annulus beneath a refueling canal, a hot leg piping system connecting said vessel to an inlet of an associated steam generator unit through which heated water flows, a cold leg piping system connecting a lower portion of said steam generator unit to said nuclear reactor vessel for returning cooled water to said vessel, a pumping unit connected in said cold leg piping system for pumping said water to said nuclear reactor vessel, and a cold leg entrance nozzle in said reactor vessel connected to said cold leg piping system, said apparatus comprising:

- a plug unit for sealing the entrance nozzle of said cold leg piping system;
- said plug including sealing means for sealing said entrance nozzle and cold leg piping system;
- an installation assembly for inserting said plug unit in said cold leg entrance nozzle;
- said installation assembly including reciprocating insertion means for inserting said plug unit into said entrance nozzle of said cold leg piping system and removing said plug unit therefrom following servicing of said nuclear reactor system;
- connecting means carried adjacent an end of said reciprocating insertion means for releasably connecting said insertion means and said plug unit so that plug unit may be left detached in said cold leg piping system after insertion; and
- means carried above said reactor vessel for raising and lowering said installation assembly in and out of said reactor vessel.

2. The apparatus of claim 1 wherein said plug unit comprises radially expandable sealing means which seals against the interior wall of said cold leg entrance nozzle and including means for urging said radially expandable sealing means in a radial direction after insertion of said plug unit.

3. The apparatus of claim 2 wherein said plug unit includes a cone-shaped tapered portion having a taper corresponding generally to the shape of said cold leg entrance nozzle wedging said plug unit against the corresponding wall of said entrance nozzle under hydrostatic pressure to retain said plug therein.

4. The apparatus of claim 2 wherein said plug unit includes contoured means urging said plug unit against a wall of said entrance nozzle under hydrostatic pressure including auxiliary sealing means for sealing said contoured means against said wall.

5. The apparatus of claim 1 wherein said insertion means includes a pair of telescoping arms carrying two of said plug units on diametrically opposite ends for simultaneous insertion in two diametrically opposed entrance nozzles providing a balanced thrust loading for stability during installation and positive alignment in said nozzles for sealing.

6. The apparatus of claim 5 wherein said connector means includes a latch carried by said plug unit and a latching member carried by each said telescoping arm which is releasable upon retraction of said arm and engagable upon extension of said arm to said plug unit.

7. The apparatus of claim 6 including an alignment means carried by said plug unit for receiving and mating said telescoping arm with said plug unit.

8. The apparatus of claim 1 wherein said installation assembly includes a plurality of telescoping arms which may be extended and retracted in axial directions corresponding to the centerlines of said nozzles facilitating indexing and simultaneous alignment therein, said connector means being carried on the end of each said arm so that a plurality of said plug units may be inserted and retracted from entrance nozzles simultaneously.

9. The apparatus of claim 1 wherein said insertion means includes at least one telescoping arm carrying one of said plug units, and means carried by said installation assembly asserting a force against said vessel opposing the force required to pull said plug unit from said nozzle by said telescoping arm.

10. The apparatus of claim 1 wherein said installation assembly includes brace means for bearing against said reactor vessel adjacent said nozzle to hold said installation assembly stationary and produce a reactionary force against which said plug means may be pulled from said entrance nozzle.

11. The apparatus of claim 1 wherein said installation assembly includes actuating means for effecting expansion and retraction of said radial seal means when said installation assembly and plug unit are attached.

12. A method of servicing a pressurized water nuclear reactor system of the type which includes a reactor vessel and an associated steam generator unit and pump unit, a plurality of nozzles carried in said vessel, a piping system connecting said nozzles and said steam generator and pump units, said method comprising:

- Providing a plug unit for insertion in each one of said nozzles desired to be plugged for servicing which includes means for sealing said nozzles in said reactor vessel against the flow of water therethrough;
- providing an installation assembly for installing said plug unit in said nozzle underwater from a remote location;
- suspending said plug installing assembly above said canal and reactor vessel;
- attaching said plug unit to said installation assembly;
- lowering said installation assembly and plug unit into said canal and the reactor vessel in axial alignment with said nozzle;
- inserting said plug unit into said nozzle;
- detaching said plug unit from said installation assembly and raising said installation assembly from said reactor vessel;
- removing the water from said piping system; and
- inspecting and servicing said steam generator and pump unit while the reactor vessel is filled with water during inspection and servicing.

13. The method of claim 12 including providing an installation assembly having a pair of telescoping arms for inserting a plurality of said plug units in a plurality of said nozzles simultaneously.

14. The method of claim 13 including providing an installation assembly having a pair of telescoping arms oppositely extending for inserting a pair of said plugs simultaneously into diametrically opposed nozzles.

15. The method of claim 13 including providing an installation assembly having a brace for supporting said assembly in a radial direction to provide a support against which said plug unit may be pulled by said assembly out of said nozzle.

16. The method of claim 12 including providing a plug unit having a tapered portion which urges said plug unit in said entrance nozzle under hydrostatic pressure.

17. The method of claim 16 including providing a plug unit having an auxiliary sealing means for sealing between said tapered portion and said entrance nozzle.

* * * * *